United States Patent [19]
Gholston

[11] Patent Number: 5,483,109
[45] Date of Patent: Jan. 9, 1996

[54] ANTI-FUEL SLOSH CIRCUIT

[75] Inventor: Jerome E. Gholston, Noblesville, Ind.

[73] Assignee: Delco Electronics Corporation, Kokomo, Ind.

[21] Appl. No.: 86,586

[22] Filed: Jul. 6, 1993

[51] Int. Cl.$^6$ .......................... G01F 23/00; H01H 35/18
[52] U.S. Cl. ........................ 307/118; 73/290 R; 73/313; 340/450
[58] Field of Search ..................... 307/118, 125, 307/360, 362; 73/313, 304 R, 304 C, 113, 290 R; 340/618, 450, 450.2

[56] References Cited

U.S. PATENT DOCUMENTS

| | | | |
|---|---|---|---|
| 4,386,406 | 5/1983 | Igarashi et al. | 364/442 |
| 4,470,296 | 9/1984 | Kobayashi et al. | 73/113 |
| 4,502,124 | 2/1985 | Grohmann et al. | 364/442 |
| 4,614,114 | 9/1986 | Matsumoto et al. | 73/313 |
| 4,625,284 | 11/1986 | Suzuki | 364/509 |
| 4,635,043 | 1/1987 | Kronenberg et al. | 340/618 |
| 4,760,736 | 8/1988 | Huynh | 73/430 |
| 4,768,377 | 9/1988 | Habelmann et al. | 73/313 |
| 4,810,953 | 3/1989 | Huynh | 324/120 |
| 4,838,082 | 6/1989 | McCoy et al. | 73/313 |
| 4,890,491 | 1/1990 | Vetter et al. | 73/290 |
| 4,991,435 | 2/1991 | Colarossi | 73/313 |
| 5,027,656 | 7/1991 | Garrison | 73/313 |
| 5,050,433 | 9/1991 | Lumetta | 73/313 |

Primary Examiner—A. D. Pellinen
Assistant Examiner—Jonathan Kaplan
Attorney, Agent, or Firm—Anthony L. Simon; Jimmy L. Funke

[57] ABSTRACT

An apparatus has a liquid level sender providing a sender output signal which varies with a measure of a liquid and which varies with a slosh of the liquid. A main control circuit couples and decouples the sender output signal to a process circuit, the process circuit provides an output signal to a liquid level indicator. Two monitor circuits monitor the output of the process circuit and provide a control signal to the main control circuit if the sender output signal varies from the output of the process circuit by more than a predetermined amount. A switch within the main control circuit decouples the sender output signal from the process circuit in response to the control signal. Sample circuitry within the process circuit drives the output of the process circuit in accordance with a sampled signal when the sender out signal is decoupled from the process circuit.

3 Claims, 2 Drawing Sheets

ANTI-FUEL SLOSH CIRCUIT

This invention relates to fluid level measurement, and more particularly, to fuel level measurement in implementations where the fuel is likely to slosh.

BACKGROUND OF THE INVENTION

A typical fuel sender in an automotive fuel tank comprises a float that floats on the surface of fuel in a fuel tank. The float is typically mounted on the end of a pivot arm, which is connected to a means for providing a resistance that varies as the float moves up and down on the surface of the fuel. A resistor is typically coupled in series with the resistance means and voltage is applied across the circuit. As the resistance of the resistance means changes, the voltage across the resistance means changes. The voltage across the resistance means is used as the sender output signal and is used as an input to a fuel gauge for indicating the amount of fuel in the tank. The fuel gauge is typically a conventional air core gauge comprising at least two coils that are energized in relation to the output signal of the fuel sender. A pointer connected to a spindle of a permanent magnet rotor is rotated in relation to the energization of the coils of the air core gauge to indicate a measure of the fuel in the fuel tank.

Because motor vehicles are subject to varying accelerations due to changes in vehicle speeds and direction, fuel in the fuel tank tends to slosh unless the tank is full. Bumpy roads may also cause the fuel in the tank to slosh. Unless countermeasures are taken, fuel slosh is reflected in the fuel gauge reading as a wavering of the gauge pointer, temporarily making determination of the actual fuel level difficult for the vehicle operator.

Presently various measures are available to partially reduce the affects of fuel slosh on the fuel reading. One example is the addition of baffles to the fuel tank, increasing the cost of the tank. Another example is damping the response of the gauge with a viscous fluid, slowing the response of the gauge.

Electronic damping of the output signal of the sender can reduce the effects of fuel slosh, reducing or eliminating the requirements of baffles and viscous damping fluid. Electronic damping in the form of RC filters requires large external components due to the large required time constants. Electronic damping in the form of microprocessor implementations requires the expense of a microprocessor.

SUMMARY OF THE INVENTION

This invention provides a low cost, easily implemented circuit apparatus and method for eliminating the effects of fuel slosh on fuel gauge indications. Advantageously, this invention provides electronic elimination of the effects of fuel slosh without requiring large external components and without requiring the expense of a microprocessor. Advantageously, this invention eliminates the effects of fuel slosh on fuel gauge readings through implementation of a method of selective switching between continuous driving of the fuel gauge directly from the sender signal and sampling and holding the fuel sender signal wherein the fuel gauge is driven by a sampled signal. The selective switching is controlled so that the first mode of direct driving from the fuel sender is selected when there is no significant fuel slosh detected from the fuel sender output signal and the second mode, sample-and-hold, is selected when the effects of fuel slosh are detected by the fuel sender output signal, thus preventing both false high and false low fuel sender readings from affecting the fuel gauge.

Structurally, the apparatus of this invention comprises means for receiving a fuel sender signal indicative of a level of fuel in the fuel tank. A control circuit comprises means for selectively coupling the fuel sender circuit to a process circuit and the process circuit comprises means for processing the fuel sender signal. A first monitor circuit monitors the fuel sender signal and compares the fuel sender signal to the output of the process circuit. The first monitor circuit also comprises means for controlling the control circuit to decouple the fuel sender signal from the process circuit if the fuel sender signal is greater than the output of the process circuit by a predetermined amount. A second monitor circuit comprises means for monitoring the fuel sender output signal and means for controlling the control circuit to decouple the fuel sender output signal from the process circuit if the fuel sender signal is less than the output of the process circuit by more than a predetermined amount. The process circuit includes means for retaining a sample of the fuel sender signal, wherein the fuel gauge is driven by the fuel sender signal when the fuel sender signal is coupled to the process circuit and wherein the fuel gauge is driven by the sampled signal when the fuel sender signal is decoupled from the process circuit.

A more detailed implementation of this invention is set forth below.

DETAILED DESCRIPTION OF THE INVENTION

Figure 1:
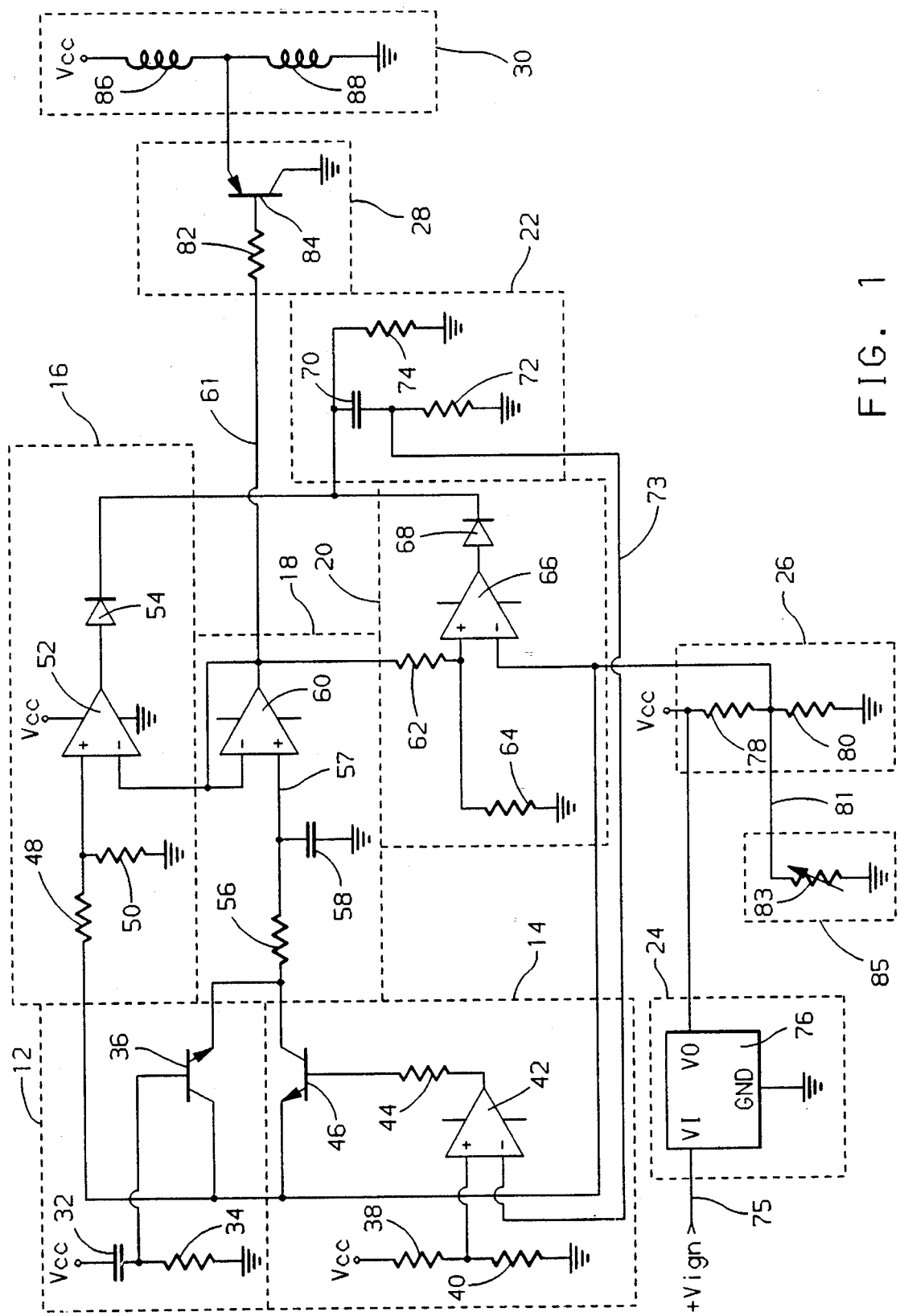
FIG. 1 illustrates the circuit apparatus of this invention.

Referring to FIG. 1, line 81 is connected to a typical fuel sender 83 of a type well known to those skilled in the art, having an output impedance that varies as a function of fuel in fuel tank 85. The output impedance of fuel sender 83 also varies with fuel slosh in the fuel tank, due to the rising and falling of the top surface of the fuel in the fuel tank during fuel sloshing.

Line 81 is connected to resistor-divider circuit 26 comprising resistors 78 and 80 and receiving power from power supply circuit 24 comprising a regulated power supply 76, which receives power from vehicle ignition on line 75. The voltage level on line 81 varies in relation to the varying impedance of fuel sender 83 and therefore, in relation to the amount of fuel in the fuel in the fuel tank.

Line 81 is connected to first and second monitor circuits 16 and 20, to main control circuit 14 and to start-up control circuit 12. Start-up control circuit 12 comprises capacitor 32 and resistor 34 connected in series between the regulated voltage supply 24 and ground. The junction of capacitor 32 and resistor 34 is connected to the base of transistor 36. During vehicle start-up, start-up control circuit 12 brings the base of transistor 36 high until capacitor 32 charges, causing transistor 36 to couple the signal on line 81 to process circuit 18 until transistor 36 shuts off. Once transistor 36 shuts off, startup control circuit 12 is not active again until the vehicle is shut off and restarted.

Main control circuit 14 comprises resistors 38 and 40 biasing the non-inverting input of amplifier 42 and also comprises transistor 46 and resistor 44. The inverting input of amplifier 42 receives a control signal from first and second monitor circuits 16 and 20. When the control signal on line 73 is low, control circuit 14 is in a first state in which amplifier 42 controls the base of transistor 46 via resistor 44 so that transistor 46 couples the sender output signal on line 81 to process circuit 18. When the control signal on line 73 goes high, the circuit is in a second state during which state amplifier 42 turns off transistor 46, effectively decoupling the fuel sender output signal from the process circuit 18.

Process circuit 18 comprises resistor 56, capacitor 58 and amplifier 60 as shown. When the fuel sender signal is coupled to process circuit 18, capacitor 58 charges to the value of the fuel sender signal and amplifier 60 outputs a value on line 61 equal to the value of the voltage across capacitor 58. The time constant of the portion of the circuit comprising resistor 56 and capacitor 58 causes the voltage level on line 57 to lag the signal on line 81. The purpose of the time delay of the lagging of the signal on line 57 with respect to the signal on line 81 will be explained further below.

The signal on line 61 is coupled to drive circuit 28 comprising resistor 82 and transistor 84, which drives a standard two-coil air core fuel gauge comprising coils 86 and 88 as shown.

The output of the process circuit, line 61, is also coupled to the first and second monitor circuits 16 and 20. First monitor circuit 16 comprises amplifier 52 having an inverting input to which is coupled the output of process circuit 18 on line 61. The non-inverting input of amplifier 52 is coupled to the sender output signal on line 81 via the resistor-divider comprising resistors 48 and 50. When the fuel sender output signal on line 81 rises above the output signal on line 61 by more than a predetermined amount, which amount is set by the values of resistors 48 and 50 and which amount may vary from implementation to implementation according to the system designer's desires, amplifier 52 outputs a signal via diode 54 to timer circuit 22.

In response to the signal output from the first monitor circuit 16, timer circuit 22 comprising capacitor 70, resistor 72 and resistor 74, brings high the control signal on line 73, which is input into the main control circuit 14, causing amplifier 42 to bring transistor 46 into a non-conductive state decoupling the fuel sender signal on line 81 from process circuit 18. The control signal remains high on line 73 until capacitor 70 charges.

With the process circuit now decoupled from the sender output signal, the process circuit outputs a signal on line 61 according to the value of the voltage stored in capacitor 58, which is the sampled signal, thereby driving the fuel gauge 30 in accordance with the sampled signal as opposed to the rising fuel sender signal, which rising fuel sender signal is caused by fuel slosh. Once capacitor 70 charges, the fuel sender signal is again coupled to process circuit 18.

The output signal of the process circuit on line 61 is also coupled to the second monitor circuit 20. The second monitor circuit 20 comprises resistors 62 and 64, amplifier 66 and diode 68. Resistors 62 and 64 comprise a resistor-divider that couples the output signal on line 61 to the non-inverting input of operational amplifier 66. The inverting input of amplifier 66 is coupled to the sender output signal on line 81. When the signal on line 81 falls below the signal on line 61 by more than a predetermined amount, which predetermined amount is set by resistors 62 and 64 and will vary from implementation to implementation as designers desire, amplifier 66 provides an output signal through diode 68 to timer circuit 22. In response timer circuit 22 brings high the control signal on line 73 in the same manner in which timer circuit 22 responds to the first monitor circuit 16. Thus, rapid decreases in fuel level output signal on line 81, due to fuel slosh, cause the control signal line 73 to go high. When line 73 goes high, main control circuit 14 responds by turning transistor 46 off into a non-conductive state, decoupling the fuel sender signal from process circuit 18, wherein the fuel gauge is driven by the sampled signal stored in capacitor 58.

The first and second monitor circuits 16 and 20 do not trigger the control signal on line 73 in response to normal fuel consumption causing a slow rate of reduction of fuel measurement. The time delay caused by resistor 56 and capacitor 58 isolates the sampled voltage in capacitor 58 from the signal on line 81 by a short time period, allowing the control signal on line 73 to be activated, causing the control circuit to decouple the signal on line 81 from the process circuit 18 before the voltage level of capacitor 58 can be significantly affected by fluctuations caused by fuel slosh.

Figure 2:
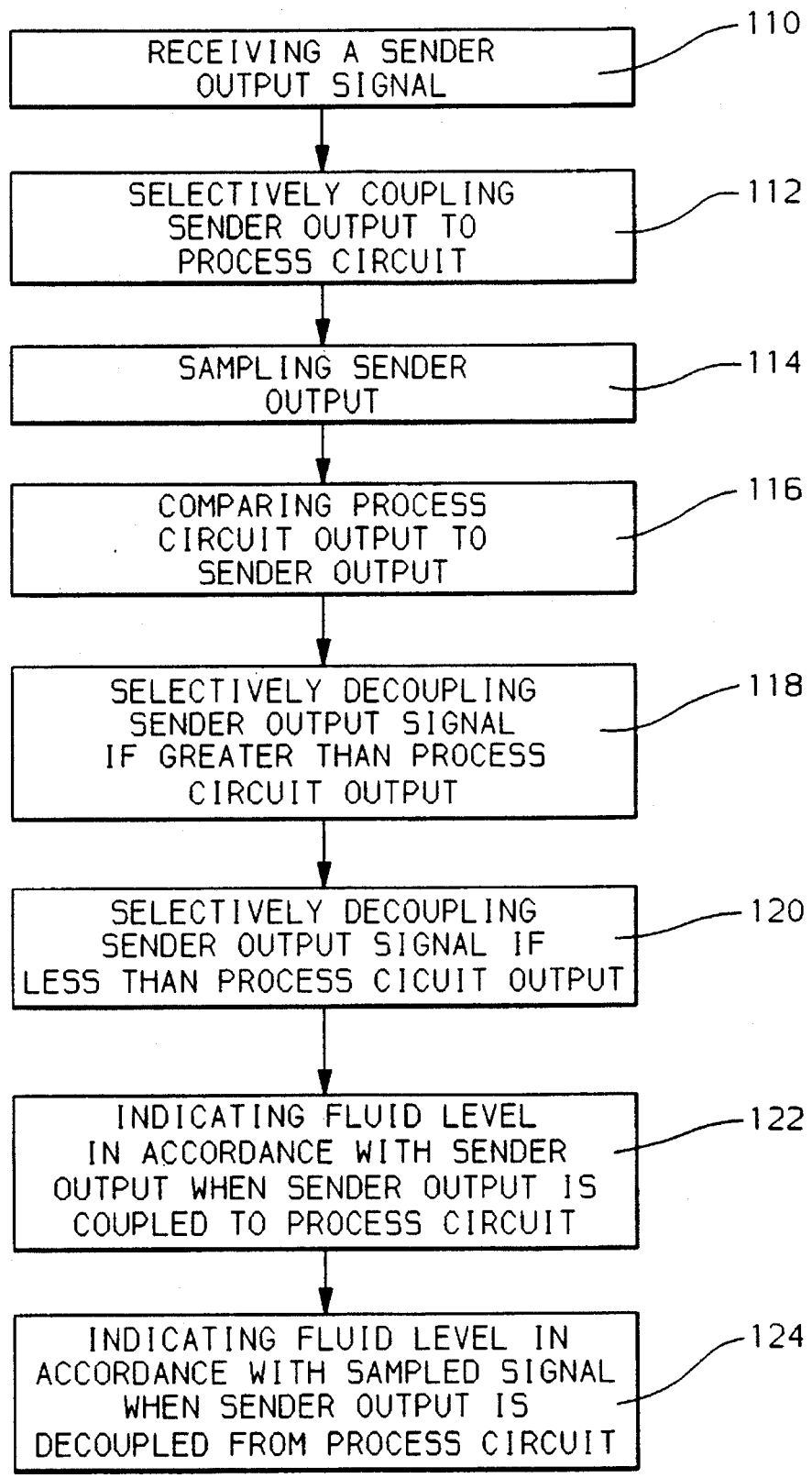
FIG. 2 illustrates the method of this invention.

The above described apparatus of this invention, illustrated in FIG. 1, also embodies the method of this invention, illustrated in FIG. 2 and comprising the steps of (a) receiving a sender output signal (110), (b) selectively coupling the sender output signal to a process circuit that applies a time delay to the sender output signal (112), (c) sampling the time delayed sender output signal to obtain a sampled signal (114), (d) comparing an output of the process circuit to the sender output signal (116), (e) selectively decoupling the sender output signal from the process circuit if the sender output signal is greater than the output of the process circuit by more than a first predetermined amount (118), (f) selectively decoupling the sender output signal from the process circuit if the sender output signal is less than the output of the process circuit by more than a second predetermined amount (120), (g) indicating a level of fluid in the tank in accordance with the sender output signal when the sender output signal is coupled to the process circuit (122), (h) and indicating a level of fluid in the tank in accordance with the sampled signal when the sender output signal is decoupled from the process circuit (124), wherein effects of fluid slosh are not noticeable when the level of fluid is indicated.

The above-described method and apparatus provide a low cost solution to the effects of fuel slosh on a fuel gauge. The circuit apparatus described above need not comprise the whole fuel processing system and may be used in conjunction with other fuel signal processing circuits. The two-coil air core gauge 30 used above is an example implementation and the circuit apparatus described above can be implemented with other types of fuel gauges including digital and electronic bar graph-type fuel gauges. Moreover, the components described above are not the only components with which this invention may be implemented and circuit replacements and substitutes, both analog and digital, are considered equivalents.

Various improvements and modifications to this invention may occur to those skilled in the art and such improvements and modifications will fall within the scope of this invention as set forth below.

The embodiments of the invention in which an exclusive property or privilege is claimed are defined as follows:

1. An apparatus comprising:

a liquid level sender providing a sender output signal that varies with a measure of the level of a liquid and that varies with a slosh of the liquid;

a main control circuit for selectively coupling and decoupling the sender output signal to a process circuit;

the process circuit providing a process output signal to drive a liquid level indicator;

first monitor circuit for monitoring the process output signal and the sender output signal and for providing a first monitor output signal if the sender output signal is greater than the process output signal by more than a first predetermined constant amount;

second monitor circuit for monitoring the process output signal and the sender output signal and for providing a second monitor output signal if the sender output signal is less than the process output signal by more than a second predetermined constant amount;

a timer circuit for receiving the first and second monitor output signals and for producing an output control signal for a predetermined period of time in response to either of the first and second monitor output signals;

means within the main control circuit for decoupling the sender output signal from the process circuit in response to the control signal; and means within the process circuit for delaying the sender output signal to produce a time delayed sender output signal, for retaining a sample of the time delayed sender output signal, and for driving the liquid level indicator with the retained sample of the time delayed sender output signal when the sender output signal is decoupled from the process circuit and for driving the liquid level indicator with the time delayed sender output signal when the sender output signal is coupled to the process circuit.

2. The apparatus as defined in claim 1, wherein the means within the process circuit for delaying the sender output signal to produce a time delayed sender output signal and for retaining a sample of the time delayed sender output signal comprises a series connected resistor and capacitor, where the sender output signal is coupled across the series connected resistor and capacitor to produce the time delayed sender output signal and sampled time delayed sender output signal across the capacitor.

3. The apparatus as defined in claim 1, which further includes:

a start-up control circuit for coupling the sender output signal to the process circuit for a predetermined start-up time period when power is applied to the apparatus.

* * * * *